United States Patent [19]

Miyahara

[11] Patent Number: 5,256,347

[45] Date of Patent: * Oct. 26, 1993

[54] METHOD OF FIRING CERAMIC HONEYCOMB STRUCTURE

[75] Inventor: Kazuhiro Miyahara, Nagoya, Japan

[73] Assignee: NGK Insulators, Ltd., Japan

[*] Notice: The portion of the term of this patent subsequent to Feb. 2, 2010 has been disclaimed.

[21] Appl. No.: 952,150

[22] Filed: Sep. 28, 1992

Related U.S. Application Data

[63] Continuation of Ser. No. 744,683, Aug. 9, 1991, abandoned, which is a continuation of Ser. No. 397,465, filed as PCT/JP 89/00191, Feb. 23, 1989, abandoned.

[30] Foreign Application Priority Data

Feb. 25, 1988 [JP] Japan .................................. 63-40599

[51] Int. Cl.$^5$ ............................................. C04B 35/64
[52] U.S. Cl. ........................................ 264/40.6; 264/63; 264/64
[58] Field of Search ............................ 264/40.6, 64, 63

[56] References Cited

U.S. PATENT DOCUMENTS

| | | | |
|---|---|---|---|
| 3,932,310 | 1/1976 | Turner | 252/455 R |
| 4,055,614 | 10/1977 | Morikawa et al. | 264/59 |
| 4,550,005 | 10/1985 | Kato | 264/177 |
| 4,680,153 | 7/1987 | Kinder et al. | 264/44 |
| 4,795,598 | 1/1989 | Billiet | 264/40.6 |
| 4,927,577 | 5/1990 | Oktaka | 264/64 |

FOREIGN PATENT DOCUMENTS

| | | |
|---|---|---|
| 0357789 | 3/1990 | European Pat. Off. . |
| 54-138005 | 10/1979 | Japan . |
| 55-144474 | 11/1980 | Japan . |
| 2112318 | 6/1983 | United Kingdom .................. 264/64 |

OTHER PUBLICATIONS

McFadden et al., The Jet Burner-A New Concept in Fast Precision Firing, Ceramic Bulletin, pp. 160-164, vol. 41, No. 3, 1962.

Primary Examiner—James Derrington
Attorney, Agent, or Firm—Parkhurst, Wendel & Rossi

[57] ABSTRACT

A method for firing a ceramic honeycomb structure by a single furnace at a predetermined temperature in a predetermined atmosphere, while controlling combustion of a burner means for heating the ceramic honeycomb structure from the outside thereof. To this end, temperatures at the inside and outside portions of the ceramic honeycomb structure are detected, and the outside temperature thereof is regulated relative to the inside temperature thereof, based on the detected temperatures. The method ensures stable firing to produce a high-quality ceramic honeycomb structure, in which a pore-forming agent is uniformly burnt throughout the inside and outside of the product and the difference in the diameter of fine holes between those inside and those outside thereof is minimized so as to eliminate occurrence of cracks within and at end portions of the ceramic honeycomb structure.

3 Claims, 5 Drawing Sheets

FIG_3a
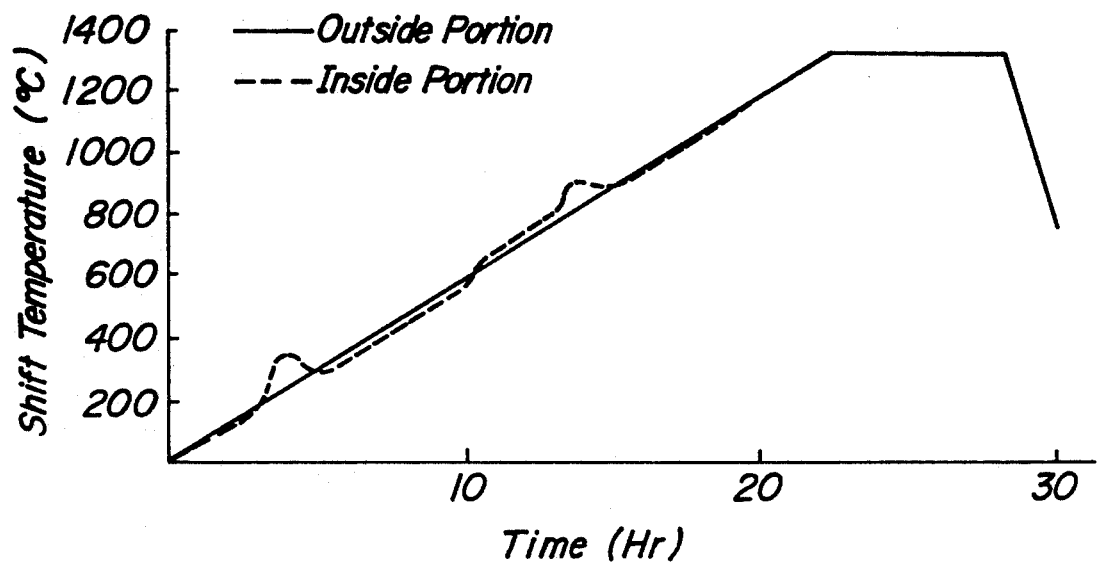
FIG_3b
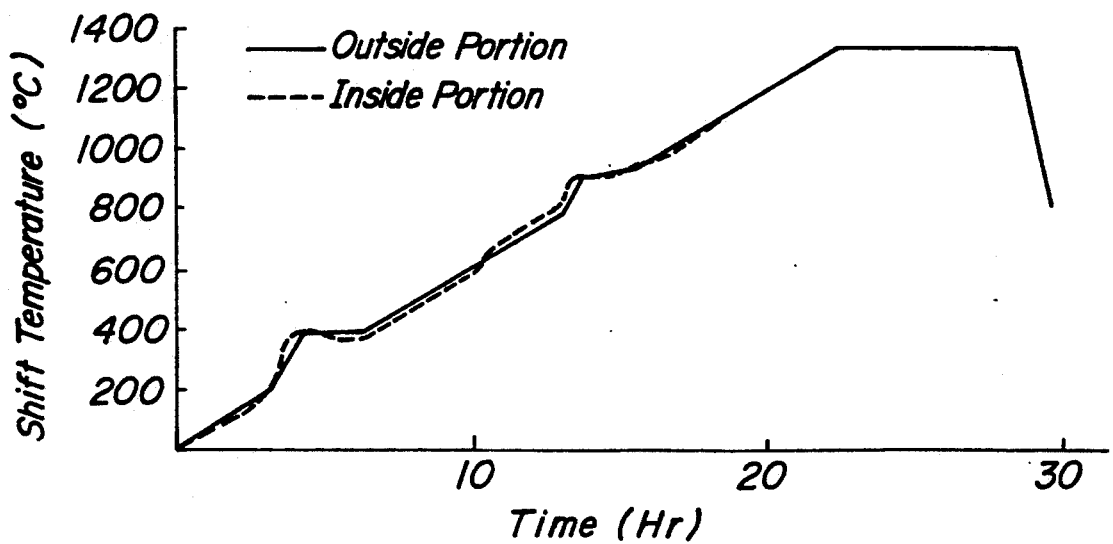

FIG_4a
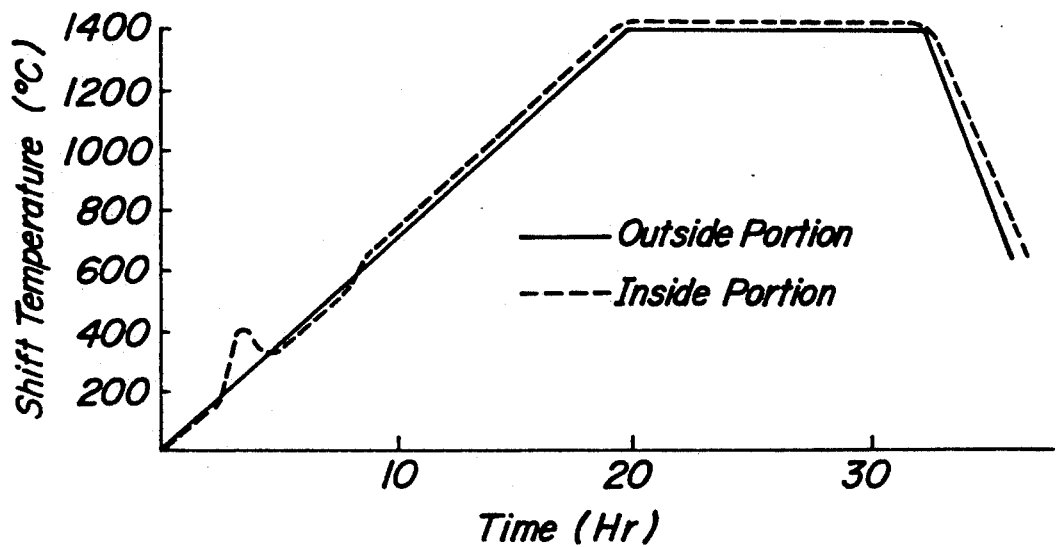
FIG_4b
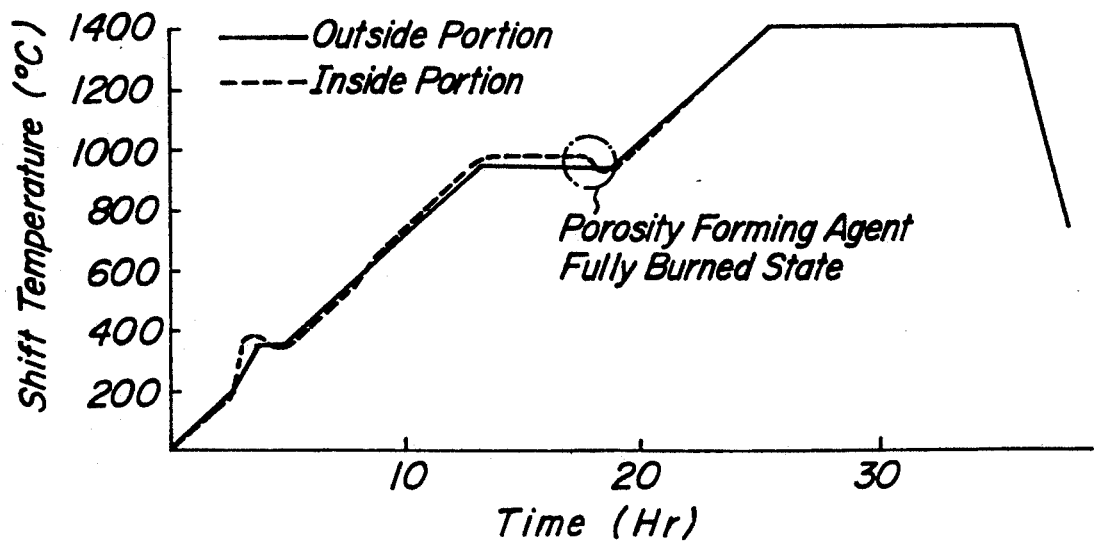

METHOD OF FIRING CERAMIC HONEYCOMB STRUCTURE

This is a continuation of application Ser. No. 07/744,683 filed Aug. 9, 191, now abandoned, which in turn is a continuation of application Ser. No. 07/397,465 filed as PCT/JP 89/00191, Feb. 23, 1989, now abandoned.

TECHNICAL FIELD

This invention relates to a method which is suitable for firing a ceramic honeycomb structure.

BACKGROUND ART

Heretofore, a ceramic product of honeycomb shape, or a ceramic honeycomb structure, has been made by preparing a ceramic green body through mixing of ceramic materials with a molding aids and a pore-forming agent, molding the body into a honeycomb-shaped ceramic green body through extrusion of the mixed body, and finally firing the honeycomb-shaped ceramic green body in a firing furnace at a predetermined temperature.

The molding aids to be mixed with the ceramic materials for the above firing of the honeycomb structure are for instance an organic binder, such as methyl cellulose, carboxymethylcellulose, polyvinyl alcohol, starch paste, flour, glycerin, and the like or a surface active agent, or wax, etc. The above pore-forming agent to be used with the ceramic materials is for instance graphite, saw dust, starch etc. Such molding aids and pore-forming agent have the following special properties; namely, the molding aids or pore-forming agent is hard to heat from the outside of the honeycomb structure, but once ignited, burns rapidly and generates heat (the igniting temperature varies depending on the kind of auxiliary). Thus, the rapid burning of the molding aids or pore-forming agent results in uneven temperature distribution in the structure and tends to cause cracks within or at end portions of the final ceramic honeycomb structure.

To prevent the occurrence of cracks, it has been practiced to use a slow rate when raising the temperature of the body being fired, so as to suppress rapid heat generation within it. However, the oxygen concentration in the firing atmosphere at a temperature in ignition ranges of the molding aids or pore-forming agent varies depending on fluctuation of the weight of ceramic green body loaded in the furnace (to be referred to as "the loaded weight", hereinafter). Hence, the manner in which the molding aids or pore-forming agent within the ceramic honeycomb body burns varies, so that the temperature difference between the inside and outer portions of the ceramic honeycomb body becomes large or small. In consequence, sometimes cracks generate but sometimes not, resulting in a problem that the quality of the product is not uniform and stable production is hard to realize.

In the firing process, the pore-forming agent comes in contact with oxygen of the firing atmosphere and burns out in a certain time period, so as to produce fine holes of a desired diameter. It has been a practice to terminate the firing process with a certain time relationship with the timing of the burn out of the pore-forming agent. However, when the above-mentioned cracks are generated, even if the loaded weight is the same at the temperature range for burning the pore-forming agent, the oxygen concentration in the firing atmosphere varies and the kind of pore-forming agent varies, so that the burning characteristics of the pore-forming agent changes. Hence, it has been experienced in actual production that a pore-forming agent within the ceramic honeycomb body sometimes burns out but sometimes not, and there is a problem that stable production of fired goods with uniform distribution of fine holes having a desired diameter throughout the inside and outer portions thereof is difficult to attain.

Therefore, an object of the present invention is to solve the above-mentioned problems of the prior art by providing an improved method of firing ceramic honeycomb structures which ensures stable production of a high-quality product.

SUMMARY OF THE INVENTION

An object of the invention is to provide a method of firing a ceramic honeycomb structure at a predetermined temperature in a predetermined atmosphere, characterized in that temperatures at inside and outside portions of the ceramic honeycomb structure are detected by a temperature sensing means, and combustion of burner means is controlled based on the temperatures thus detected.

In the method of the invention, the temperatures at the inside and outside portions of the ceramic honeycomb structure are detected, and based on the detected temperatures, the outside temperature is controlled relative to the inside temperature by regulating the combustion of a burner means which heats the ceramic honeycomb structure from the outside thereof. For instance, when the inside temperature becomes higher than the outside temperature due to rapid combustion of the molding aids or the pore-forming agent, the heat supply from the burner means will be increased so as to raise the outside temperature to a level corresponding to the inside temperature. Sometimes, the heat supply from the burner means will be decreased so as to suppress the outside temperature. With such control, stable firing is ensured even when the temperature difference between the inside and outside of the shaped body varies due to fluctuation of the loaded weight of shaped bodies and due to changes in the conditions of the molding aids and/or pore-forming agent.

Referring to FIG. 5, when perfect combustion of the pore-forming agent is reached, the outside temperature of the body being fired coincides with the inside temperature thereof. The combustion of a burner means is controlled while detecting and monitoring the inside and outside temperatures until the above temperature coincidence is reached, for instance by keeping constant combustion in the vicinity of the above coincidence. With such control, stable firing can be effected even when the burning characteristics of the pore-forming agent varies due to fluctuation in the loaded weight of shaped bodies or due to change in the state of the pore-forming agent, and such stable firing enables production of high-quality goods.

BRIEF DESCRIPTION OF THE DRAWINGS

FIG. 2a through FIG. 4b are graphs showing temperature variations at the inside and outside portions of specimens of shaped body when such specimens were heated in the ensuing Experiments 1 through 3, covering both the method of the invention and a conventional method.

Figure 1:
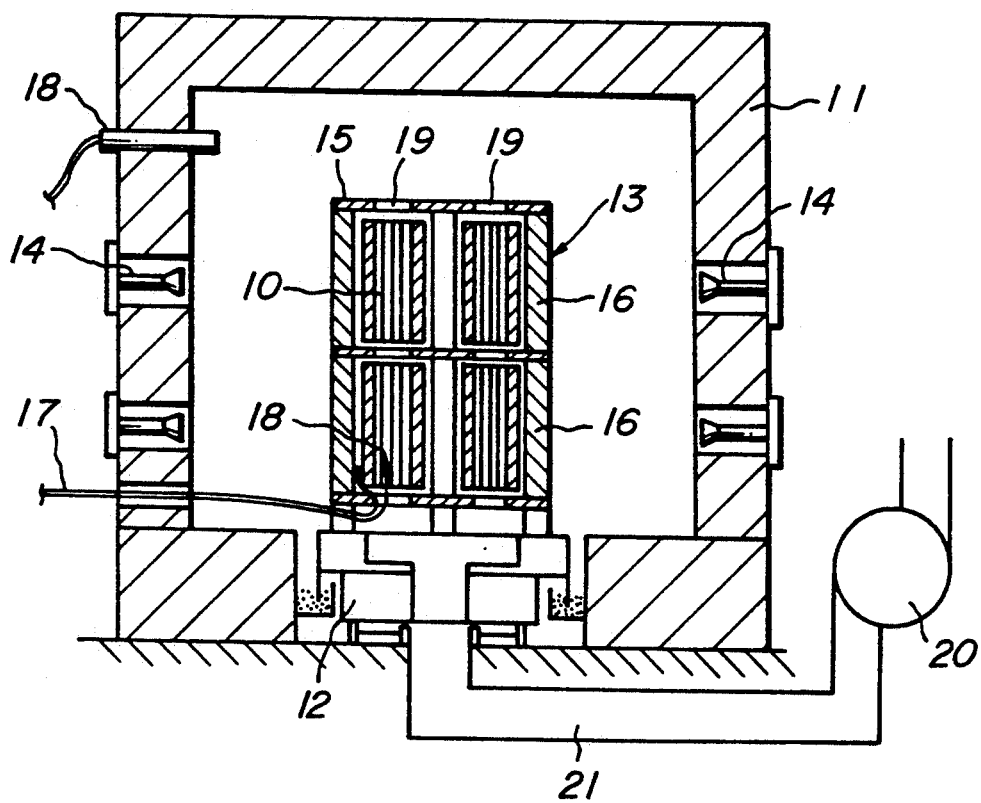
FIG. 1 is a sectional view of a firing furnace to be used for working the firing method according to the present invention.

Throughout different views of the drawings, the following symbols are used.

| 10 | a shaped body | 11 | a firing furnace |
| --- | --- | --- | --- |
| 12 | a truck | 13 | a shelf |
| 14 | a burner | 15 | a shelf board |
| 16 | a flame interrupting board | | |
| 17 | a thermocouple | 18 | an oxygen sensor |
| 19 | a hole | 20 | an exhaust blower |
| 21 | an exhaust passage | | |

DETAILED DESCRIPTION OF THE INVENTION

Before firing a ceramic honeycomb structure by the method of the invention, a shaped body is prepared at first by mixing ceramic materials of a desired grain size, making a plastic batch by adding molding aids and/or a pore-forming agent to the mixture so as to plasticize the mixture, molding the plastic batch into a shaped body of honeycomb form through extrusion, and then drying the extruded body. A desired ceramic honeycomb structure can be obtained by firing the above shaped body by the method of the invention; namely, by firing the shaped body, while detecting the temperatures at the inside and outside of the shaped body, so as to control the combustion of a burner means, which heats the ceramic honeycomb structure from the outside thereof, in such a manner that the outside temperature of the shaped body is regulated to a level corresponding to the inside temperature thereof.

In carrying out the above firing, at least two thermocouples are applied to the specific shaped body, one inside and one outside thereof, so as to measure the temperature difference between the inside and outside portions. The thermocouples measure the temperature difference between the inside and outside portions (inside-outside temperature difference) of the honeycomb structure. In the temperature range wherein the molding aids or pore-forming agent burns, the above inside-outside temperature difference is generally large due to heat generation from such burning aids unless it is fully burnt out. Area having such inside-outside temperature difference is detected, and the combustion of a burner means is controlled at the detected area until the complete burn out of the pore-forming agent (coincidence of the inside temperature with the outside temperature) is reached. Preferably, the oxygen concentration in the firing atmosphere is kept at an excessive state, because it is hard for the pore-forming agent contained within the inside of the honeycomb shaped body to come into contact with oxygen of the firing atmosphere, and it is hard to ignite and to burn out such aids unless excessive oxygen is available.

Suitable molding aids can be selected, depending on the use, from the group consisting of an organic binder, such as methyl cellulose, carboxymethylcellulose, polyvinyl alcohol, starch paste, flour, glycerin, and the like, a surface active agent, wax, etc. A suitable pore-forming agent can be selected from the group consisting of graphite, saw dust, starch etc.

EXPERIMENT 1

Shaped bodies 10 were prepared by weighing and mixing ceramic materials of kaolin and alumina to produce a mixture of mullite composition, plasticizing the mixture by adding methyl cellulose as a molding aid, molding the plasticized mixture, and drying. Separately, shaped bodies with flour added therein as a molding aid also were prepared.

The shaped bodies 10 were loaded in a firing furnace 11 by placing them on shelves 13 carried by a mobile truck 12 in the furnace. The loading was effected at the loaded weights of Table 1 and the shaped bodies 10 were heated with a mean temperature rise rate of the same table. The temperature was increased by combustion at burners 14 buried in opposite sidewalls of the furnace 11. To prevent flames of the burners 14 from coming in direct contact with the shaped bodies 10 or the ceramic honeycomb structures, flame interrupting boards 16 were disposed between outside posts of the shelves 13, which interrupting boards 16 were solid members made of mullite-mixed body. Shelf boards 15 were placed at the bottom and top of the shelves 13. Two thermocouples 17 were applied to one of the shaped bodies 10 placed in the firing furnace 11, one at the inside portion and one at the outside portion thereof. To measure the oxygen concentration of the firing atmosphere in the furnace 11, the active portion of an oxygen sensor 18 was disposed within the firing furnace 11 and it was connected to the outside through the sidewall of the furnace.

To allow the firing atmosphere to reach the inside of the shaped bodies 10, holes 19 were bored through each of the shelf boards 15 at portions facing the shaped bodies 10. Such holes 19 were found to be preferable. To minimize the inside-outside temperature difference of each shaped body 10, an exhaust passage 21 was formed through the truck 12 and the bottom wall of the furnace 11, and an exhaust blower 20 was installed at the outer end of the exhaust passage 21, so as to make the firing atmosphere flow through the inside of the shaped bodies 10.

The firing temperature was raised to a maximum temperature of 1,400° C. and the maximum temperature was kept for 2.5 hours. Then it was cooled at a rate of 150° C./hour.

The result of the above firing is shown in Table 1.

Figure 2A:
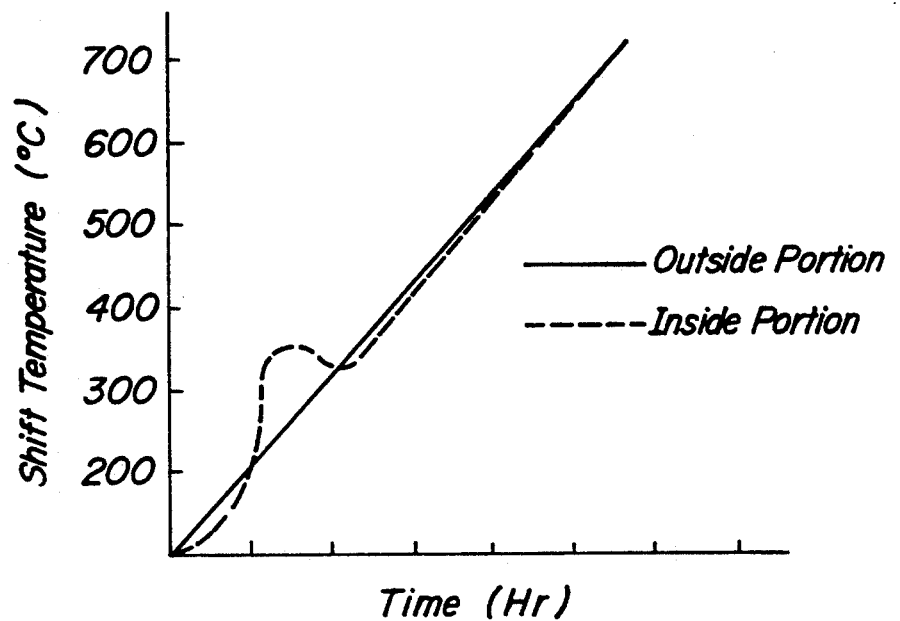
Figure 2B:
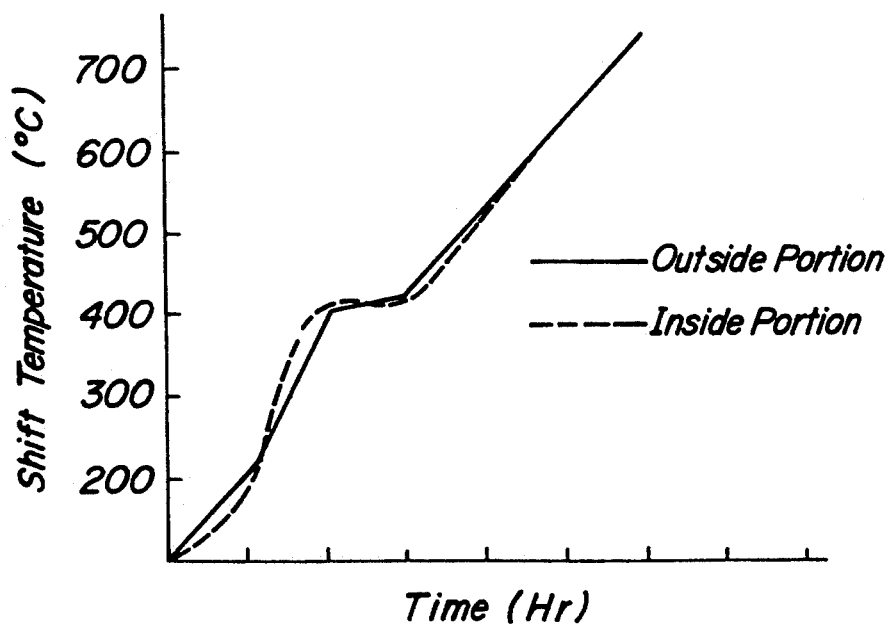
Figure 5:
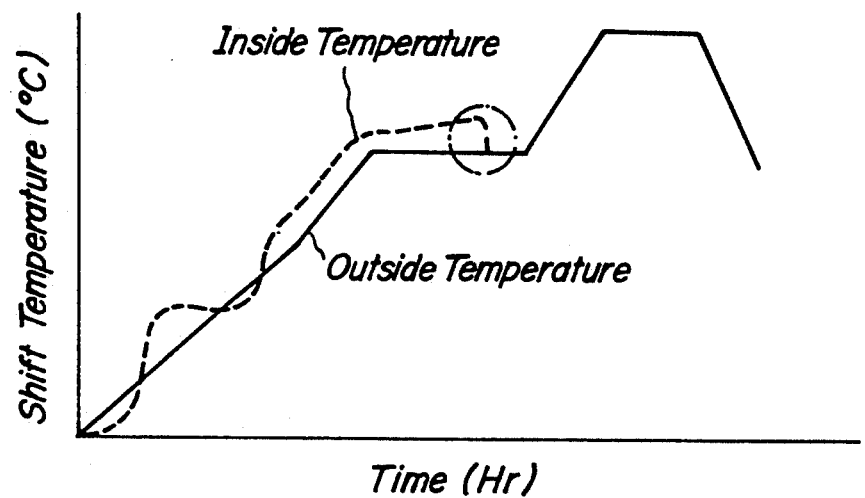
FIG. 5 is a graph showing how the burn out of a pore-forming agent is reflected in the temperature change of a shaped body being fired.

As can be seen from the data of Table 1 on both the specimen 1 of the invention and specimen 4 of the prior art, the specimen 4 without the burner combustion control in response to the shaped body temperature had cracks generated therein, but the specimen 1 of the invention with the above burner combustion control was free from cracks. FIG. 2a shows the temperature variation during the firing of the specimen 4, and one can note a temperature difference between the inside and the outside portions of the shaped body in a temperature range of 200°-300° C. due to the burning heat of the molding aids. Such temperature difference appears to be the cause of the cracks. On the other hand, in the case of the specimen 1 of the invention, the combustion of the burners was controlled in response to the rise and fall of the body inside temperature, and the inside-outside temperature difference of the shaped body was minimized as shown in FIG. 2b, and no cracks were generated in the specimen 1.

TABLE 1

| Item | Specimen Invention 1 | Specimen Invention 2 | Specimen Invention 3 | Prior art 4 |
|---|---|---|---|---|
| Fired body composition | mullite | mullite | mullite | mullite |
| Material | ·kaolin ·alumina | ·kaolin ·alumina | ·kaolin ·alumina | ·kaolin ·alumina |
| Molding auxiliary | methylcellulose | methylcellulose | flour | methylcellulose |
| Hole-making auxiliary | none | none | none | none |
| Loaded weight (kg) | 300 | 100 | 300 | 300 |
| Mean temperature rise rate (°C./hr) | 50 | 30 | 50 | 50 |
| Body inside-outside temperature difference (°C.) at burning of molding auxiliary | 100 | 180 | 200 | 100 |
| at burning of hole-making auxiliary | — | — | — | — |
| Oxygen (O$_2$) concentration (%) at burning of molding auxiliary | 18 | 120 | 17 | 18 |
| at burning of hole-making auxiliary | — | — | — | — |
| Control in response to rise and fall of body inside temperature | done | done | done | no |
| Confirmation of complete burning out of hole-making auxiliary | — | — | — | — |
| Rate of crack occurrence (%) | 0 | 0 | 0 | 68 |
| Burning degree of hole-making auxiliary inside residual of partly burnt stuff | — | — | — | — |
| inside-outside difference of fine hole diameter (μm) | — | — | — | — |
| Overall appraisal | good | good | good | not good |

Experiment 2

Shaped bodies were prepared by mixing ceramic materials of talc, kaolin and alumina at a rate of cordierite composition, plasticizing the mixture through addition of starch paste as a molding aids and saw dust as a pore-forming agent, molding the plasticized mixture, and drying. Separately, shaped bodies with graphite added therein as a pore-forming agent were also prepared.

The shaped bodies were loaded in the shelves of the firing furnace 11 to fire them in the manner similar to that of Experiment 1 except the conditions of Table 2. The temperature was raised to a maximum temperature of 1,350° C. and the maximum temperature was kept for 6 hours. Then, it was cooled. The result of the above firing is shown in Table 2.

As can be seen from the data of Table 4 on the specimen 1 of the invention and specimen 4 of the prior art of this Experiment, the specimen 4 without the burner combustion control in response to the shaped body temperature had a crack occurrence rate of 60%, but the specimen 1 of the invention with the above burner combustion control was free from cracks. FIG. 3a shows the temperature variation during the firing of the specimen 4, in which temperature differences between the inside and the outside of the shaped body are noted during temperature rise at two ranges of 200°-300° C. and 800°-900° C., and such temperature differences appear to be the cause of the cracks. On the other hand, in the case of the specimen 1 of the invention, the head quantity from the combustion at the burners was increased or decreased in response to the rise and fall of the body inside temperature; and the inside-outside temperature difference of the specimen 1 was minimized during the temperature rise as shown in FIG. 3b, and no cracks were generated in the specimen 1.

TABLE 2

| Item | Specimen Invention 1 | Specimen Invention 2 | Specimen Invention 3 | Prior art 4 |
|---|---|---|---|---|
| Fired body composition | cordierite | cordierite | cordierite | cordierite |
| Material | ·talc ·kaolin ·alumina | ·talc ·kaolin ·alumina | ·talc ·kaolin ·alumina | ·talc ·kaolin ·alumina |
| Molding auxiliary | starch paste | starch paste | starch paste | starch paste |
| Hole-making auxiliary | saw dust | saw dust | saw dust | saw dust |
| Loaded weight (kg) | 300 | 150 | 300 | 300 |
| Mean temperature rise rate (°C./hr) | 60 | 50 | 60 | 60 |
| Body inside-outside temperature difference (°C.) at burning of molding auxiliary | 90 | 120 | 90 | 90 |
| at burning of hole-making auxiliary | 80 | 100 | 10 | 80 |
| Oxygen (O$_2$) concentration (%) at burning of molding auxiliary | 19 | 20 | 19 | 19 |
| at burning of hole-making auxiliary | 12 | 15 | 8 | 12 |
| Control in response to rise and fall of body inside temperature | done | done | done | no |
| Confirmation of complete burning out of hole-making auxiliary | — | — | done | no |
| Rate of crack occurrence (%) | 0 | 0 | 0 | 60 |
| Burning degree of hole-making auxiliary inside residual of partly burnt stuff | none | none | none | none |
| inside-outside difference of fine hole diameter (μm) | 0 | 0 | 0.5 | 0 |

TABLE 2-continued

| Item | Specimen | | | |
|---|---|---|---|---|
| | Invention | | | Prior art |
| | 1 | 2 | 3 | 4 |
| Overall appraisal | good | good | good | not good |

Experiment 3

Shaped bodies were prepared by mixing ceramic materials of talc, kaolin and alumina at a rate of cordierite composition, plasticizing the mixture through addition of glycerin as a molding aids and graphite as a pore-forming agent, molding the plasticized mixture, and drying. Separately, shaped bodies with saw dust therein as a pore-forming agent were also prepared.

The shaped bodies were loaded in the shelves of the firing furnace 11 to fire them in the manner similar to that of Experiment 1 except the conditions of Table 3. The temperature was raised to a maximum temperature of 1,410° C. and the maximum temperature was kept for 10 hours. Then, it was cooled. The result of the above firing is shown in Table 3.

The specimen 1 of the invention and specimen 4 of the prior art in this Experiment will be compared by referring to the data of Table 3. With the specimen 4, combustion control in response to the shaped body temperature was not effected, and its firing was finished after having a temperature difference between the inside and the outside of the shaped body at a range of 200°-320° C. during the temperature rise as shown in FIG. 4a. Checking of the product after the firing indicated cracks generated and the presence of residual of incompletely burnt pore-forming agent inside the body. Measurement of the diameters of fines holes at the inside and the outer portion of the fired body showed that it was 5 μm at the inside and 15 μm at the outer portion.

On the other hand, in the case of the specimen 1 of the invention, the heat quantity from the combustion at the burners was increased or decreased in response to the rise and fall of the body inside temperature, and the inside-outside temperature difference of the specimen 1 was minimized during the temperature rise as shown in FIG. 4b. As to the combustion of the pore-forming agent in the above-mentioned temperature range of 800°-900° C., perfect combustion was confirmed by keeping the burner combustion conditions constant while maintaining a constant rate of temperature rise or constant slope of the temperature rise curve.

Rate of crack occurrence (%) was checked by visual inspection of the fired bodies after the above firing treatment. No cracks were found in the specimen of the invention. As to the burning degree of the pore-forming agent, there was no residual of incompletely burnt pore-forming agent and the inside-outside difference of fine hole diameter was within 1-2 μm in the case of the specimens of the invention.

The invention is not restricted to the foregoing processing of the specimens and examples described above, and numerous modifications and changes are possible without departing from the scope of the ensuing claim.

INDUSTRIAL APPLICABILITY

As apparent from the detailed description in the foregoing, with the method of firing ceramic honeycomb structures according to the invention, heat quantity from burner means is increased or decreased in the temperature range for combustion of the molding aids or pore-forming agent, in response to the rise or fall of the inside temperature of the honeycomb body being fired, which inside temperature change is due to rapid combustion of such auxiliaries. Hence, the temperature at the outer portion of the honeycomb body is controlled, i.e., raised or lowered, so as to eliminate the inside-outside temperature difference. For instance, constant burner conditions are maintained until com-

TABLE 3

| Item | | Specimen | | | |
|---|---|---|---|---|---|
| | | Invention | | | Prior art |
| | | 1 | 2 | 3 | 4 |
| Fired body composition | | cordierite | cordierite | cordierite | cordierite |
| Material | | ·talc | ·talc | ·talc | ·talc |
| | | ·kaolin | ·kaolin | ·kaolin | ·kaolin |
| | | ·alumina | ·alumina | ·alumina | ·alumina |
| Molding auxiliary | | glycerin | glycerin | glycerin | glycerin |
| Hole-making auxiliary | | graphite | graphite | saw dust | graphite |
| Loaded weight (kg) | | 600 | 1,000 | 600 | 600 |
| Mean temperature rise rate (°C./hr) | | 70 | 70 | 70 | 70 |
| Body inside- | at burning of molding auxiliary | 80 | 100 | 80 | 80 |
| outside temperature difference (°C.) | at burning of hole-making auxiliary | 10 | 5 | 80 | 10 |
| Oxygen ($O_2$) | at burning of molding auxiliary | 15 | 16 | 15 | 15 |
| concentration (%) | at burning of hole-making auxiliary | 8 | 5 | 12 | 8 |
| Control in response to rise and fall of body inside temperature | | done | done | done | no |
| Confirmation of complete burning out of hole-making auxiliary | | done | done | done | no |
| Rate of crack occurrence (%) | | 0 | 0 | 0 | 40 |
| Burning degree of hole-making auxiliary | inside residual of partly burnt stuff | none | none | none | present |
| | inside-outside difference of fine hole diameter (μm) | 2 | 1 | 0 | 10 |
| Overall appraisal | | good | good | good | not good | plete burn out of the pore-forming agent is confirmed, so as to prevent the occurrence of any cracks within and at outer portions of the honeycomb structure. Further, the firing is effected in such a manner that the pore-forming agent is burnt uniformly throughout the honeycomb structure, from the inside to the outer portion thereof, so as to ensure stable production of high-quality fired products having fine holes whose diameters rae uniform through inside and outer portions of the products. In short, the method of the invention is useful for firing ceramic honeycomb structures.

I claim:

1. A method of firing a ceramic honeycomb structure containing organic additives, said method comprising the steps of:

placing a first thermocouple inside the ceramic honeycomb structural body, and placing a second thermocouple directly adjacent to and outside the ceramic honeycomb structural body to detect temperatures at inside and outside portions of the ceramic honeycomb structural body;

detecting a differential temperature condition between said inside and outside portions of said ceramic honeycomb structure, said differential temperature condition resulting from non-uniform combustion of said organic additives at inside and outside portions of said ceramic honeycomb structure; and controlling combustion of burner means based on the detected differential temperature condition.

2. The method of claim 1, wherein said first thermocouple is provided in a through hole formed in said ceramic honeycomb structure.

3. The method of claim 1, wherein said combustion of burner means is controlled so as to maintain temperatures at said inside and outside portions of the ceramic honeycomb structure substantially constant.

* * * * *